March 11, 1952 — V. F. GOUCH — 2,588,827
COUPLING
Filed May 29, 1948
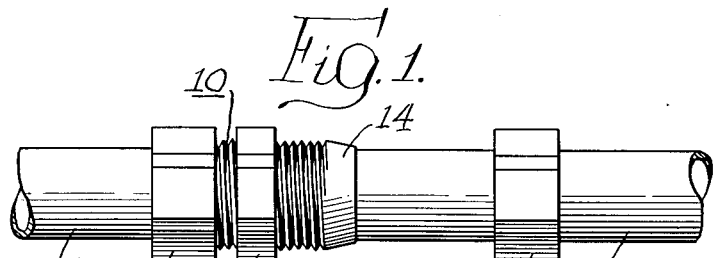
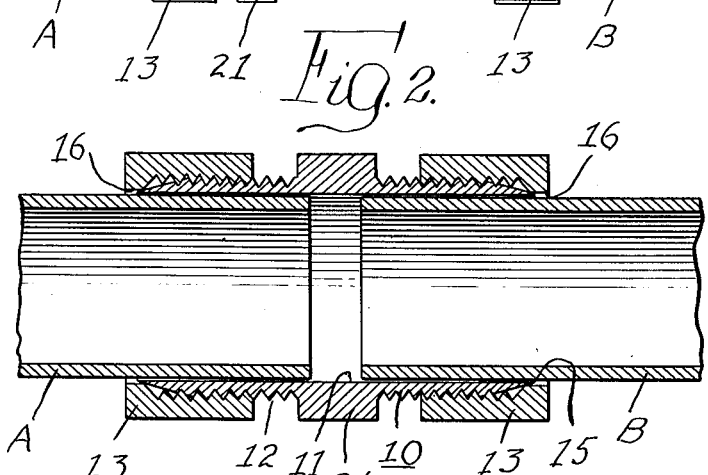
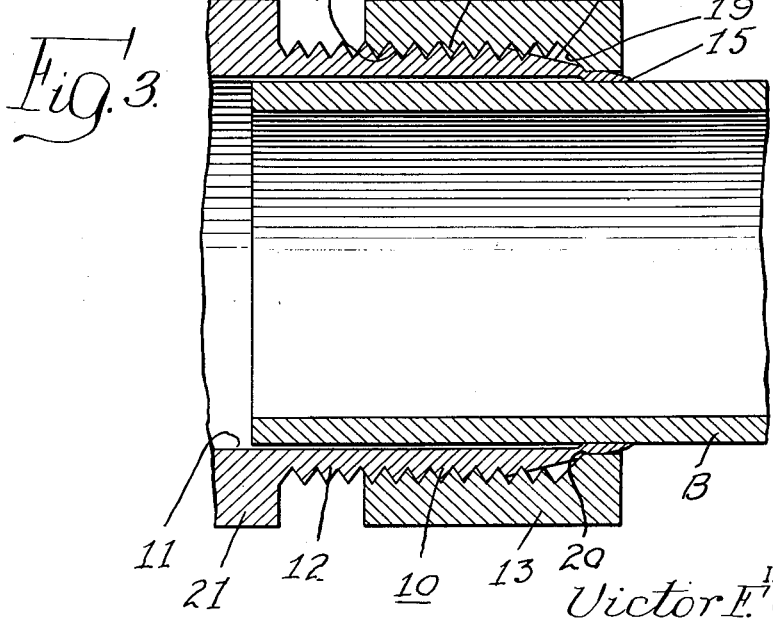
INVENTOR.
Victor F. Gouch,
BY Fidler, Crouse & Beardsley
Attys.

Patented Mar. 11, 1952

2,588,827

UNITED STATES PATENT OFFICE 2,588,827

COUPLING

Victor F. Gouch, Plano, Ill.

Application May 29, 1948, Serial No. 30,002

6 Claims. (Cl. 285—123)

My invention relates to couplings and has to do particularly with a coupling for effecting a fluid-tight connection between pipes or like members.

An object of the invention is to provide a new and improved coupling.

Another object is to provide a coupling which may be readily assembled with and secured to the unthreaded ends of two pipes or other members to securely couple the pipes together and provide a fluid-tight joint.

Another object is to provide a coupling which may be made by simple machine operations and which lends itself readily to manufacture by quantity production methods.

Another object is to provide a coupling which has a relatively small number of parts, all of which are simple in form and may be made inexpensively.

Still another object is to provide a coupling which does not require a close fit with the pipes or other coupled members and therefore may be used with pipes or other members which have substantial manufacturing variations in diameter.

A further object is to provide a coupling for pipes or other members which may be readily assembled with and secured on the members and may be readily disassembled and removed from the members without in any way damaging them.

A further object is to provide a coupling which serves both to secure pipes or other members firmly and rigidly in coupled relation and to seal the joint, without requiring any separate sealing elements such as sealing washers, packing or the like.

A further object is to provide a coupling embodying clamping nuts for maintaining the coupling and coupled members in assembled relationship, which nuts after being tightened are firmly held in place without the need for additional holding or locking means.

A still further object is to provide a coupling which may be assembled with the coupled members and secured merely by the use of ordinary wrenches or like gripping tools and does not require any other tools or equipment for assembling it on the coupled members.

Other objects and advantages will appear from the following description, taken in connection with the appended drawings, wherein:

Figure 1 is a side elevational view of a preferred form of coupling in accordance with my invention, the coupling being shown as assembled with two pipes, and with one of the clamping nuts removed from the body or sleeve;

Fig. 2 is a view of a section taken along a longitudinal axial plane through the coupling, the latter being shown as assembled with two pipes, with the clamping nuts being shown threaded onto the body but not set up; and Fig. 3 is an enlarged, fragmentary, longitudinal sectional view showing one end portion of the coupling and an associated pipe, with the parts being shown in their condition when the clamping nut is set up to lock and seal the pipe in the coupling.

The present invention is particularly well adapted for connecting or coupling two pipes or similar members forming a conduit for electrical conductors or for coupling two pipes forming a fluid conduit. However, as will be apparent as the description proceeds, the device disclosed herein also may be employed for connecting two solid members or rods or for connecting a pipe or rod to some other type of member. In many applications, it is desired to provide a coupling which is fluid-tight, as for example where the pipes carry a fluid; also, where the pipes are employed as electrical conduits, it is desirable that the joint be suitably sealed against the entrance of moisture or vapor-laden air which may have a detrimental effect on the electrical conductors. Also, it is important where the coupling is used with electrical conduits, to insure a tight seal so as to prevent fires or explosions should arcing occur in the enclosed conductors in a location where the conduit is exposed to explosive or inflammable vapors. The present invention provides a coupling which securely maintains the members with which it is employed in coupled relation and effectively seals the joint.

In accordance with a preferred embodiment of the present invention, a sleeve is provided which is adapted to receive the ends of the pipes or other members to be coupled, and clamping nuts are threaded onto the sleeve from opposite ends, the sleeve and clamping nuts being so formed that when the nuts are tightened on the sleeve or "set up," the extreme end portions of the sleeve are deformed into tight clamping engagement with the adjacent portions of the pipe to both lock the pipes in the sleeve and to effect a fluid-tight seal between the pipes and the sleeve.

Referring now particularly to the drawings, the sleeve 10 takes the form of a tubular member of generally cylindrical shape and having a bore 11 extending therethrough for receiving the ends of the two pipes A and B which are to be coupled by the coupling, the inner wall surface of the bore 11 being preferably smooth and of slightly greater diameter than the external diameter of the pipes A and B, for a purpose which will hereinafter appear.

The sleeve 10 is provided with external threads 12 at its two end portions for the reception of clamping nuts 13. At the outer ends of the sleeve, the external wall is formed with an inclined surface 14 which provides a wall portion tapering in thickness to a very thin edge 15 at the extreme outer end of the sleeve, which may be designated as "knife" edge. While the angle which the inclined surface 14 makes with the axis of the sleeve bore 11 may vary considerably, it is desirable that it be a relatively small angle and preferably not substantially in excess of approximately 20°.

The sleeve is formed of any suitable material which is appropriate to the particular application in which the coupling is to be used. For many applications, such as where the coupling is used with electrical conduits, the sleeve may be formed of mild steel. However, where the coupling is used with pipes which carry corrosive fluid, the sleeve preferably is formed from a non-corrodible material such as brass, or suitably plated steel. It will usually be found convenient to make the nuts of the same material as the sleeve, or if desired, in many cases may be formed of mild steel, even where the sleeve is formed of other material.

Each nut 13 is formed with a cylindrical bore 16 at the end thereof which is of such diameter as to receive the outer end portion of the sleeve and with an enlarged bore or counterbore 17 extending inwardly from the opposite end to a point short of the bore 16 and provided with internal threads 18 adapted to fit the threads 12 of the sleeve. Extending from the inner end of the counterbore 17 and the bore 16 is a tapered conical surface portion 19 which provides an inclined internal wall surface and which at its juncture with the bore 16 provides a circumferential edge 20 surrounding the bore 16. The surface 19 makes an angle with the axis of the bore of the nut which is substantially greater than the angle of taper of the surface 14 and preferably is approximately 45°.

The sleeve 10 preferably is provided at its central portion with a portion 21 of an enlarged diameter and of polygonal—preferably hexagonal—contour, by which the sleeve may be held in a vise or wrench or other holding means while tightening the nuts 13 onto the sleeve 10.

To couple two pipes such as the pipes A and B together, the pipe ends are inserted in the sleeve 10, either spaced, as shown, or in abutting relation, the nuts 13 preferably having been previously screwed onto the coupling but not tightened, as illustrated in Fig. 2 of the drawings. The sleeve is then firmly held either in a vise or by a wrench or other holding means and the nuts are either separately or simultaneously tightened, or "set up," on the sleeve by rotating them with a wrench or other gripping means. As each nut 13 is set up on the sleeve, the knife edge 15 enters the bore 16 and the edge 20 engages the inclined outer wall surface 14. Upon further tightening of the nut and consequent travel inwardly along the sleeve, the edge 20 bites into the surface 14 and deforms the adjacent portion of the sleeve 10, thereby causing the end portion of the sleeve which enters between the wall of the bore 16 and the pipe to be contracted into tight clamping and sealing engagement with the corresponding portion of the pipe. As the nut is further rotated, the end portion of the sleeve is further deformed or "spun" against the pipe. Since the knife edge 15 is of less diameter than the bore 16, it enters the bore without deformation and since the taper of the wall surface 14 is relatively small and the wall therefore is relatively thin, the end portion of the sleeve which enters the bore 16 is spun against the pipe in generally cylindrical form and embraces the pipe throughout a continuous circumferential zone or band, thereby providing a seal of substantial length in an axial direction. Preferably, the bore of the sleeve is of slightly greater diameter than the pipe so that when the pipe is inserted in the sleeve, a slight clearance space is provided. Thus, when the nut is set up on the sleeve, the outer end portion of the sleeve is deformed into tight, sealing engagement with the pipe. The bore 16 is of such length that the corresponding portion of the nut has a substantially greater wall thickness than the tapered end of the sleeve and thus only the end of the sleeve, and not the nut, is deformed when the nut is set up on the sleeve.

While the present invention has been disclosed herein in connection with a device for coupling two pipes together, it will be understood that the invention is not thus limited. For example, a device such as disclosed herein may be employed for connecting two rods or bars. Moreover, it is not necessary that the device be formed similarly at the two ends but it may be formed with the threaded and tapered end portion at one end, and provided with a single cooperating nut, and at the other end may be otherwise formed for attachment to another pipe or some other member, and, for example, may be either externally or internally threaded or may be formed with a flange or socket or other formation for attachment to another element.

Thus, it will be seen from the foregoing that the present invention provides a pipe coupling which is of very simple form and which at the same time firmly grips the pipes and provides a fluid-tight seal between the sleeve of the coupling and the pipes. It will be noted that both the sleeve and the nuts are of simple form and may be produced readily by quantity production methods; it will be seen that most of the operations of forming the parts may be performed on automatic screw machines. Since the central portion, the threaded portions which extend therefrom, and the tapered end portions of the sleeve are all formed integrally, the sleeve not only may be formed readily, but since the coupling thus is constituted by a relatively small number of parts, there is a minimum of expense involved in handling during manufacture and a minimum chance of loss of parts.

Since the tapered portion of the sleeve is of relatively thin-walled form and may be readily deformed into tight-fitting engagement with the pipe, it is not necessary to slit this portion of the sleeve in order to permit it to be contracted against the adjacent portion of the pipe. Moreover, the construction is such that while the nuts may be readily tightened onto the sleeve, the deformation of the sleeve into the space between the pipe and the wall of the sleeve bore aids in retaining the nut on the sleeve and it is not necessary to provide any other locking means.

The coupling may be readily disassembled, if such should become necessary or desirable, by merely backing off either or both of the nuts— as the case may require—from the sleeve and withdrawing the pipe, or pipes, from the sleeve. Since the sleeve does not bite into the pipes, the latter are not marred or rendered unusable in any respect. Moreover, if it is desired, the coupling may again be used, although generally it is preferable to employ a new sleeve upon each new application of the coupling. Inasmuch as the coupling may be made very inexpensively, the sleeve portion at least may be discarded after removal from the pipes.

The portions of the sleeve which are deformed against the pipes are of substantial axial length and engage the pipe throughout a circumferentially continuous zone and thereby provide an effective fluid-tight seal, as above explained. For this reason, it is not necessary to provide any additional sealing elements such as sealing washers, gaskets or the like. Thus, not only is the expense of manufacture less than where such other sealing members are employed, but the life of the coupling is greatly increased since there are no members which are subject to deterioration as is often the case with gaskets or washers formed of rubber or leather or the like materials.

I claim:

1. A pipe coupling comprising a sleeve having a bore for receiving two pipes to be coupled, said bore being formed with a smooth inner wall surface of uniform and slightly greater diameter than that of the outer wall surface of the pipes to be coupled and an outer surface threaded at portions spaced from the outer ends thereof and tapering therefrom toward said outer ends, and internally threaded clamping nuts, each adapted to be screwed onto the sleeve from an end thereof respectively and having an internal, circumferential edge disposed and dimensioned to engage the tapered outer wall surface portion of said sleeve and having a portion immediately in advance of said edge of sufficiently great internal diameter to be substantially out of contact with said sleeve, said edge alone being thereby operative to deform the end portion of said tapered outer wall surface portion substantially radially inwardly into tight sealing engagement with the corresponding pipe when the nut is tightened on the sleeve.

2. A pipe coupling comprising a sleeve having a bore for receiving two pipes to be coupled, said bore being formed with a smooth inner wall surface of uniform and slightly greater diameter than that of the outer wall surface of the pipes to be coupled and an outer surface threaded at portions spaced from the outer ends thereof and tapering therefrom to said outer ends at a small angle to provide a thin-walled portion with terminal knife edges, and internally threaded clamping nuts, each adapted to be screwed onto the sleeve from an end thereof respectively and having an internal, circumferential edge element substantially V-shaped in cross-section disposed and dimensioned to engage the tapered outer wall surface portion of said sleeve, the leading surface of said edge element inwardly diverging from said tapered portion and being inclined less than 90° from the axis of the coupling, said edge element being operative to deform the end portion of said tapered portion into substantially cylindrical form and into tight sealing engagement with the corresponding pipe.

3. A pipe coupling comprising a sleeve having a bore for receiving opposite ends of two pipes to be coupled and having end portions threaded inwardly of their outer ends and tapering in wall thickness at their outer ends, and internally threaded clamping nuts adapted to be screwed onto said end portions respectively, each nut having an internally threaded counterbore for receiving one of the threaded portions of said sleeve, a cylindrical bore of less diameter than the counterbore for receiving the end of the sleeve and a tapered bore between the counterbore and the cylindrical bore providing with the latter an internal edge positioned to engage the tapered portion of the sleeve and contract the latter against the pipe when the nut is screwed onto the sleeve.

4. A pipe coupling comprising a sleeve having a cylindrical bore extending therethrough for receiving the ends of two pipes to be coupled, and an outer wall surface threaded at portions spaced inwardly from the ends and tapering therefrom to the ends at an angle of not substantially in excess of approximately 20° to the axis of said bore to provide a thin-walled knife edge at the end of the sleeve, and internally threaded clamping nuts adapted to be screwed onto said sleeve, each of said nuts having a bore adapted to receive an end of said sleeve and an internal tapered surface diverging from the bore at an angle of substantially 45° to the axis of the bore and providing with the bore an edge positioned to engage the tapered surface on the sleeve and to deform the end portion of the sleeve into tight, sealing engagement with the corresponding pipe when the nut is tightened on the sleeve.

5. A pipe coupling comprising a sleeve having a cylindrical bore of uniform diameter therethrough adapted to receive a pipe to be coupled and slightly larger than the pipe, said sleeve having an externally threaded body portion and a thin-wall end portion tapering generally toward its outer end at an angle of not substantially in excess of 20 degrees, and a clamping nut adapted to be screwed onto said sleeve and having internal threads engageable with said sleeve threads and an internal sleeve-engaging portion, said end portion and said sleeve-engaging portion being formed with face portions which initially diverge inwardly away from each other and which are adapted to engage when said nut is screwed onto said sleeve, whereby said end portion is deformed into tight-fitting engagement with said pipe.

6. A pipe coupling comprising a sleeve having a bore for receiving two pipes to be coupled, the outer surface of said sleeve being threaded at portions spaced from the outer ends thereof and tapering therefrom to said outer ends at a small angle whereby the tapered portions have substantial axial extent and are thin-walled throughout their axial extent and have terminal knife edges, and internally threaded clamping nuts, each adapted to be screwed onto the sleeve from an end thereof respectively and having an internal, circumferential edge portion disposed and dimensioned to engage the tapered portion of the sleeve, said edge portion having a leading face diverging abruptly from the tapered portion of the sleeve, whereby only the radially innermost portion of the edge portion engages the tapered portion of the sleeve and is effective for deforming the end portion thereof into substantially cylindrical form and into tight sealing engagement with the corresponding pipe.

VICTOR F. GOUCH.

REFERENCES CITED

The following references are of record in the file of this patent:

UNITED STATES PATENTS

| Number | Name | Date |
|---|---|---|
| 2,458,833 | Carignan | Jan. 11, 1949 |

FOREIGN PATENTS

| Number | Country | Date |
|---|---|---|
| 273,369 | Great Britain | June 20, 1927 |
| 554,841 | France | Mar. 10, 1923 |